(12) United States Patent
Takahashi et al.

(10) Patent No.: US 7,742,279 B2
(45) Date of Patent: Jun. 22, 2010

(54) ENERGY CONVERSION DEVICE

(75) Inventors: Hirofumi Takahashi, Hitachi (JP);
Kyoko Honbo, Hitachinaka (JP);
Masanori Sakai, Hitachiota (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 319 days.

(21) Appl. No.: 12/022,208

(22) Filed: Jan. 30, 2008

(65) Prior Publication Data
US 2008/0206638 A1 Aug. 28, 2008

(30) Foreign Application Priority Data
Feb. 26, 2007 (JP) .............................. 2007-045657

(51) Int. Cl.
*H01G 9/00* (2006.01)
(52) U.S. Cl. ................. 361/502; 361/503; 361/504; 361/508; 361/512; 361/523
(58) Field of Classification Search ................ 361/502, 361/503–504, 508–512, 516–519, 523, 525–529, 361/540–541; 29/25.01, 25.03
See application file for complete search history.

(56) References Cited

U.S. PATENT DOCUMENTS

| | | | | |
|---|---|---|---|---|
| 5,150,283 | A * | 9/1992 | Yoshida et al. | 361/502 |
| 5,420,747 | A * | 5/1995 | Ivanov et al. | 361/502 |
| 5,450,279 | A * | 9/1995 | Yoshida et al. | 361/502 |
| 5,621,607 | A * | 4/1997 | Farahmandi et al. | 361/502 |
| 6,031,712 | A * | 2/2000 | Kurihara et al. | 361/502 |
| 6,201,685 | B1 * | 3/2001 | Jerabek et al. | 361/502 |
| 6,258,337 | B1 * | 7/2001 | Sonobe et al. | 423/445 R |
| 6,558,437 | B2 * | 5/2003 | Wei et al. | 29/25.03 |
| 2003/0219653 | A1 | 11/2003 | Kelley et al. | |
| 2006/0269801 | A1 | 11/2006 | Honbo et al. | |

FOREIGN PATENT DOCUMENTS

| | | |
|---|---|---|
| JP | 63-086266 | 4/1988 |
| JP | 63-187560 | 8/1988 |

(Continued)

OTHER PUBLICATIONS

L.Lam, et al., "Development of Ultra Battery for Hybrid-Electric Vehicle Application", VRLA Traction, Jun. 13-14, 2005, Honolulu, Hawaii.

*Primary Examiner*—Nguyen T Ha
(74) *Attorney, Agent, or Firm*—Antonelli, Terry, Stout & Kraus, LLP.

(57) ABSTRACT

A secondary battery comprises a single-plate lead acid battery (Va), a positive electrode capacitor layer and a negative electrode capacitor layer, which are formed on the respective surfaces of a positive electrode plate, and a negative electrode plate. Each of the positive electrode plate and negative electrode plate contains an active material, to have a configuration in which activated carbon has a concentration gradient. The electronic resistance between a collector terminal and the center of a portion where activated carbon is present at a high concentration is lower than the electronic resistance between the collector terminal and the center of a portion where activated carbon is present at a low concentration. In the single-plate lead acid battery, charges are accumulated in the positive electrode capacitor layer and in the negative electrode capacitor layer.

9 Claims, 6 Drawing Sheets

FOREIGN PATENT DOCUMENTS

| | | |
|---|---|---|
| JP | 08-180858 | 7/1996 |
| JP | 2001-210354 | 8/2001 |
| JP | 2002-015729 | 1/2002 |
| JP | 2002-367613 | 12/2002 |
| JP | 2003-051306 | 2/2003 |

\* cited by examiner

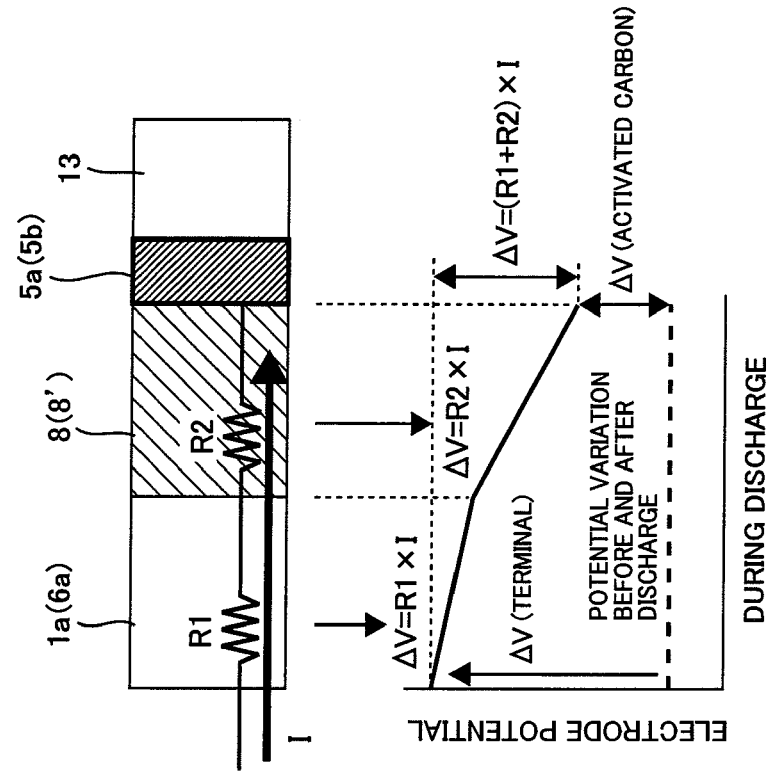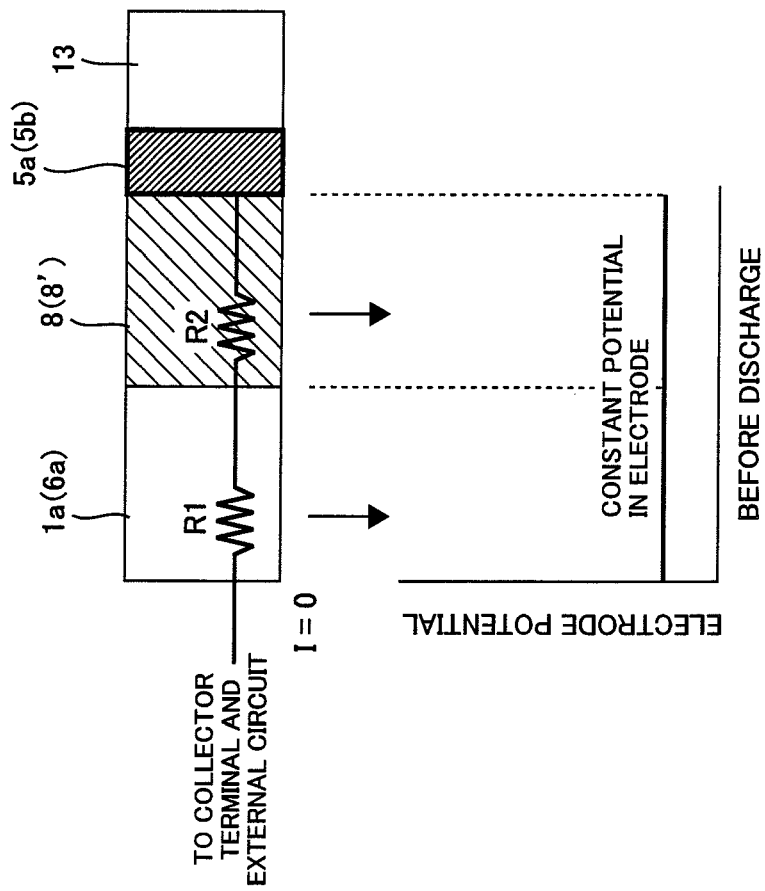

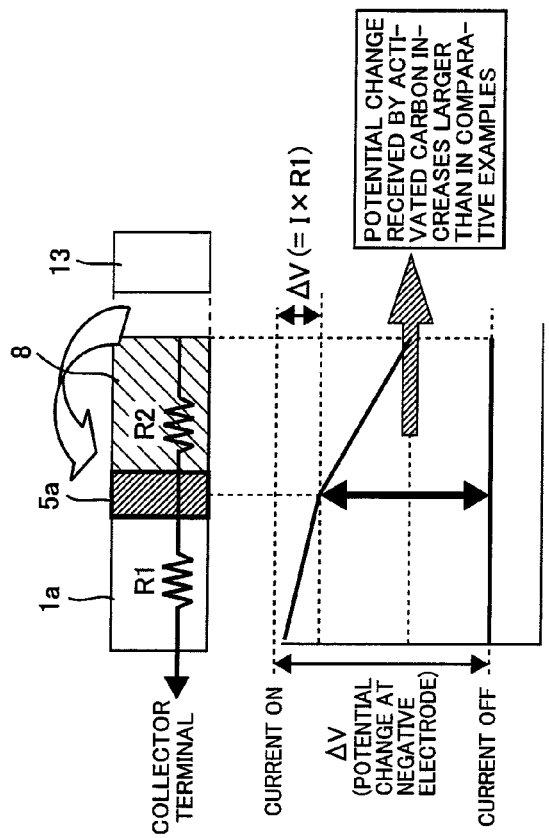
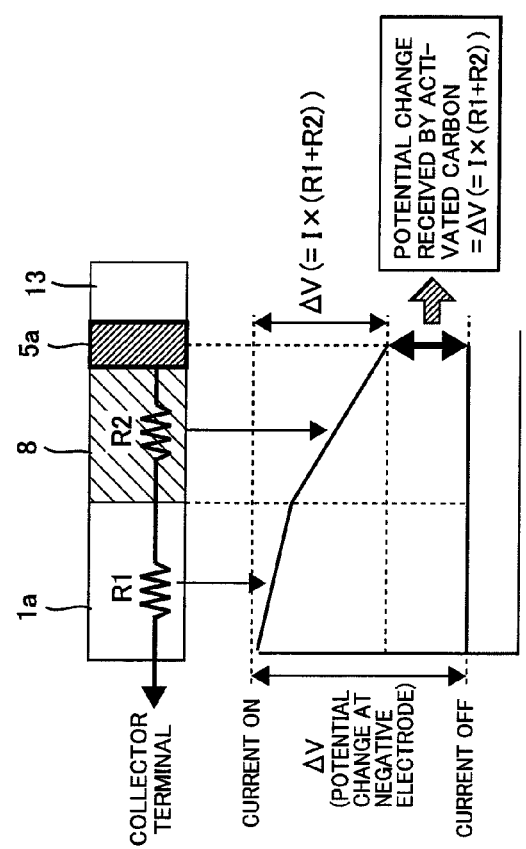

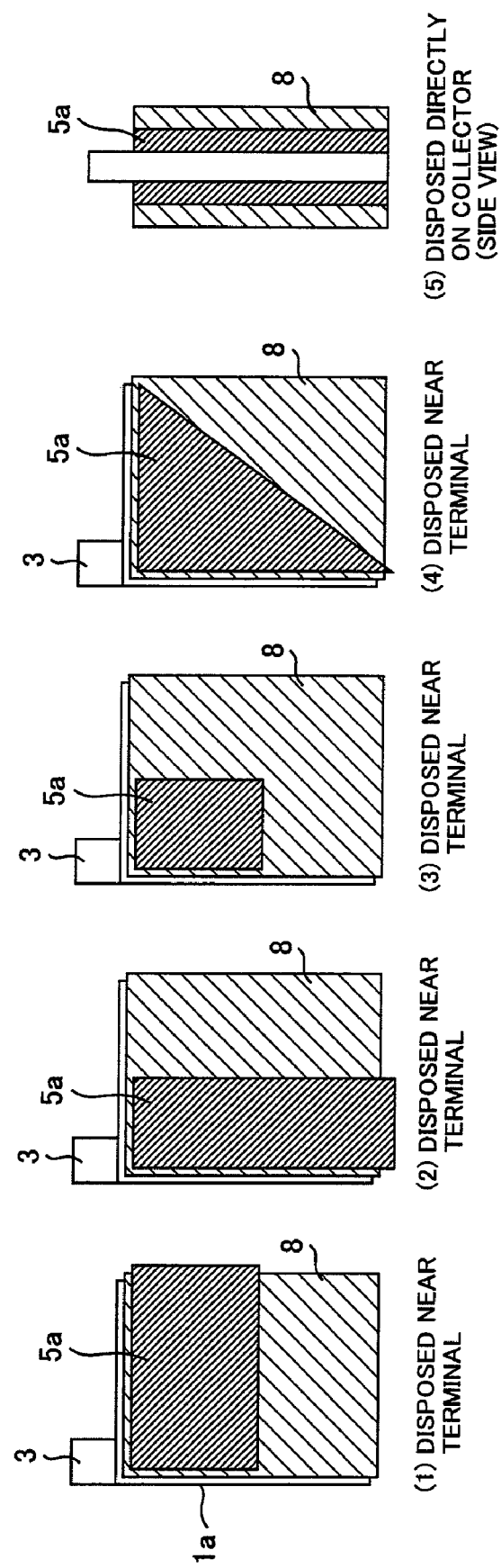

R1 < R2 IS SATISFIED

EVENLY DISPOSED ON
ELECTRODE SURFACE (1) PLAN VIEW    (2) SIDE VIEW

ACTIVATED CARBON IS NOT
DISPOSED ON ELECTRODE SURFACE (1) PLAN VIEW    (2) SIDE VIEW

ENERGY CONVERSION DEVICE

CLAIM OF PRIORITY

The present application claims priority from Japanese application serial No. 2007-45657, filed on Feb. 26, 2007, the content of which is hereby incorporated by reference into this application.

FIELD OF THE INVENTION

The present invention relates to an energy conversion system using an electric double-layer capacitor material, examples of application of which include a lead acid battery and an electrode for the lead acid battery.

BACKGROUND OF THE INVENTION

An electric double-layer capacitor using the formation of an electric double layer for energy storage performs charging and discharging only through the movement of ions without requiring an oxidation-reduction reaction required by a secondary battery. Therefore, the electric double-layer capacitor has the advantages of an excellent output characteristic and reduced degradation. Since the electric double-layer capacitor utilizes the natural phenomenon of the formation of the electric double layer, the device structure thereof is simpler than that of a parallel-plate condenser or the like. In addition, because the spacing between electrode plates in the condenser is on the order of the size of an ion in the electric double-layer capacitor, the electric double-layer capacitor has the advantage of a large capacitance. On the other hand, a low energy density and the like can be listed as disadvantages of the electric double-layer capacitor.

The electric double-layer capacitor is used in two different applications. In one of the two applications, the electric double-layer capacitor is primarily used alone. In the other application, the electric double-layer capacitor is used in conjunction with another type of energy conversion device such as a secondary battery or a fuel battery. In either case, the electric double-layer battery performs an important function as an energy conversion device.

In recent years, improvements in the performance of equipment using the above-mentioned energy conversion device, including the electric double-layer capacitor, are remarkable. With the improvements in the performance of the equipment, there has been a growing demand for an improvement in the performance of the energy conversion device.

Among numerous existing energy conversion devices, a lead acid battery for an automobile can be listed as one of the most frequently used devices. As the lead acid battery for an automobile, a high-output type capable of instantaneously extracting a large current is demanded to allow constant starting from a state where an engine is cool. A temporal scale is in the range of, e.g., about 0.2 seconds to 1 second, and a characteristic which allows retention of a high voltage within the time is required. In consideration of the tendency of a load, such as a motor mounted in a vehicle or the like, to keep increasing, a lead acid battery which provides a higher output than a conventional lead acid battery has done is in demand. In an idle stopping vehicle and a hybrid vehicle in which the charging and discharging of a lead acid battery is repeatedly and frequently performed also, a lead acid battery which provides a higher output more stably than the conventional lead acid battery has done is in demand.

In Patent Document 1, it is proposed to add a substance having a desulfurization catalytic effect or a SOx oxidation catalytic effect to a carbon material containing activated carbon or cause the carbon material to support such a substance and add the resulting material to a negative electrode, thereby improving the charge acceptance of a battery.

In Patent Document 2, it is proposed to produce an electrode using an active material mixture paste produced by adding conductive carbon and activated carbon to a negative-electrode active material, thereby achieving an improvement in conductivity and an increase in the capacity of an electric double layer and holding a battery voltage high immediately after discharging.

In Patent Document 3, it is proposed to cover a surface of the positive electrode of a lead acid battery with a porous carbon material, thereby improving the charge acceptance of the lead acid battery.

In Patent Document 4, it is proposed to remove an impurity in an electrolytic solution by bringing activated carbon into contact with the electrolytic solution to cause adsorption of the impurity, thereby reducing self-discharging.

Patent Document 1: JP-2002-367613 A
Patent Document 2: JP-2003-51306 A
Patent Document 3: JP-H8-180858 A
Patent Document 4: JP-2001-210354 A The task of the present invention is to provide a lead acid battery having an output characteristic more excellent than that of a conventional lead acid battery and an electrode for the lead acid battery used therein. An object of the present invention in an energy conversion device to which an electric-double-layer capacitor material capable of high-speed charging and discharging is added is to enhance the effect of the addition of activated carbon by making most effective use of the electric-double-layer capacitor material and provide a device with a higher input/output capability and a higher energy density.

SUMMARY OF THE INVENTION

The present invention relates to an energy conversion device including: at least a pair of electrodes at least one of which contains a capacitor material; and an electrolyte having ion conductivity and electron insulation, the energy conversion device using an electric double layer formed at an interface between the capacitor material and the electrolyte to store energy, wherein a layer of the capacitor material is formed to be closer to a collector terminal than an active material layer of each of the electrodes such that an electronic resistance A between a collector terminal and a center of gravity of a portion of the electrode on which the capacitor material layer is formed is lower than an electronic resistance B between the collector terminal and a center of gravity of an active material layer of the electrode.

The present invention relates to the energy conversion device wherein the capacitor material layer is formed on the electrode and further relates to an energy conversion device wherein a portion A and a portion B are formed in the electrode such that an electronic resistance between a collector terminal, and a center of gravity of the corresponding one of the portions is lower in the portion A than in the portion B and the capacitor material is disposed to have a concentration per unit area or per unit volume which is higher in the portion A than in the portion B (where the concentration of the capacitor material in the portion B includes zero).

The present invention includes an energy conversion device in which a capacitor material for accumulating charges in each of the electrodes containing the active material is added to be disposed in a larger amount in a portion of the electrode having a lower electronic resistance measured from the collector terminal and disposed in a smaller amount in a portion of the electrode having a higher electronic resistance measured from the collector terminal.

In accordance with the present invention, it is possible to provide an energy conversion device which provides a high output by making most effective use of a capacitor material.

BRIEF DESCRIPTION OF THE DRAWINGS

FIGS. 3(a) and 3(b) are diagrams each illustrating the operation of a known energy conversion device;

FIGS. 4(a) and 4(b) are diagrams each illustrating the operation and effect of an energy conversion device according to the present invention;

FIGS. 6(1) to 6(5) include plan views and a side cross-sectional view showing structures of electrodes according to various embodiments of the present invention;

DETAILED DESCRIPTION OF THE PREFERRED EMBODIMENTS

Figure 1:
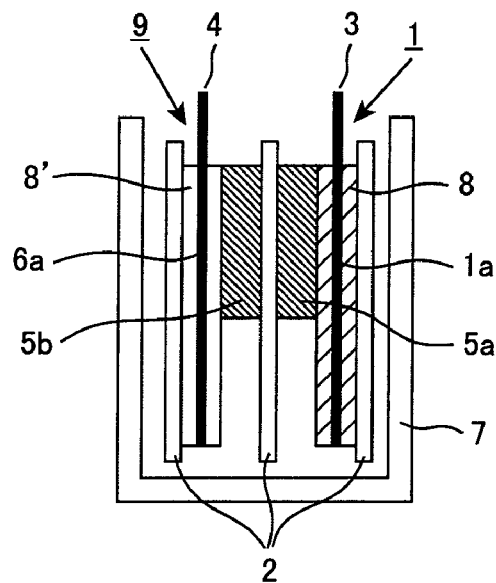
FIG. 1 is a schematic cross-sectional view showing a structure of an energy conversion device according to an embodiment of the present invention.

First, the concept of the present invention will be described. In a technology for adding activated carbon or the like as an electric-double-layer capacitor material to an energy conversion device, there has conventionally been known a method which aims at providing a higher input/output and a higher energy density by improving the specific surface area and pore distribution of activated carbon and the like.

However, the present inventors have found that not only the physical properties of activated carbon, but also the disposition of activated carbon in an electrode largely contributes to implementing the effect of the addition of activated carbon. As for the proper disposition of activated carbon, it will be described hereinbelow. By properly disposing activated carbon, it becomes possible to effectively achieve the effect of the addition of activated carbon. As a result, a smaller-size and lighter-weight energy conversion device can be realized by reducing an amount of activated carbon.

Activated carbon adsorbs ions to the interface between a material and an electrolytic solution directly proportionally to a potential change, and accumulates and releases charges without involving an electrochemical reaction. Because the amount of charges that can be accumulated and released by a unit weight of activated carbon increases directly proportionally to a change in the potential of the material, the effect of the addition of activated carbon increases. However, causing a large potential change for releasing a large amount of charges increases a reduction in the voltage of the device, which leads to a reduction in the output of the device. To produce a device which is large in the effect of the addition of activated carbon and high in output and energy density by eliminating the contradiction described above, it is appropriate to use the distribution of potential changes in the electrode. The guideline for the use of the potential change distribution in the electrode will be described hereinbelow.

FIGS. 3(a) and 3(b) are schematic diagrams each of the vicinity of an interface when an activated carbon layer 5a or 5b is formed as a capacitor material on the surface of a known negative electrode for a lead acid battery having an active material layer formed on a collector and immersed in a sulfuric acid 13. When a current is zero (the left-hand view), the same potential is provided in the entire electrode. Each of the graphs in the drawings shows a potential distribution in the electrode.

When discharging is initiated, the potential increases in the negative electrode and a potential gradient determined by the product of a current value and an electronic resistance occurs in the electrode, as shown in FIG. 3(b). For simplicity, it is assumed that the whole collector has a single resistance value R1 and the whole active material layer has a single resistance value R2. The right-hand view shows the vicinity of the interface during discharging, in which a discharge current value is denoted by I.

The potential gradient determined by the electronic resistance and the current is shown in each of the graphs in FIGS. 3(a) and 3(b). The dotted line in the graph of FIG. 3(b) shows an electrode potential prior to discharging.

In the case of measuring a potential at an electrode, a potential and a potential variation $\Delta V$ (terminal) at a terminal portion are actually measured, and a potential variation $\Delta V$ (activated carbon) actually received by activated carbon 12 as the capacitor material has a value obtained by subtracting the value of a potential change determined by the product of an electronic resistance and a current value from the terminal of a collector 10 from the actually measured potential variation $\Delta V$ (terminal). As long as the electronic resistance between the collector terminal and a portion to which activated carbon has been added is not zero, $\Delta V$ (activated carbon)<$\Delta V$ (terminal) is constantly satisfied, and the amount of charges resulting from the discharging of activated carbon, which is determined directly proportionally to $\Delta V$ (activated carbon), is constantly smaller than a value calculated from the measured potential variation $\Delta V$ (terminal).

At his time, $\Delta V$ (activated carbon) and $\Delta V$ (terminal) have the following relationship therebetween.

$$\Delta V(\text{activated carbon}) = \Delta V(\text{terminal}) - \Delta V(\text{Potential Variation Resulting from Electronic Resistance from Collector Terminal}:(R1+R2) \times I).$$

Therefore, to increase the amount of charges resulting from the discharging of activated carbon, it is appropriate to reduce the resistance of a collector 6a or an active material 8 or 8' or add activated carbon to a portion having a small potential variation (the second term on the right side of the foregoing numerical expression) resulting from the electronic resistance from the collector terminal. Numerous reports have been made on reductions in the resistances of the collector and the active material portion.

Figure 5A:
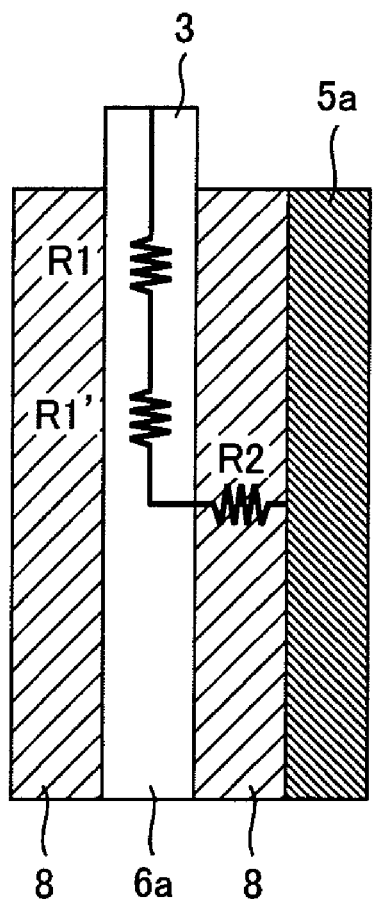
FIGS. 5(a) and 5(b) are diagrams showing examples of a structure of an energy conversion device according to an embodiment of the present invention.
Figure 5B:
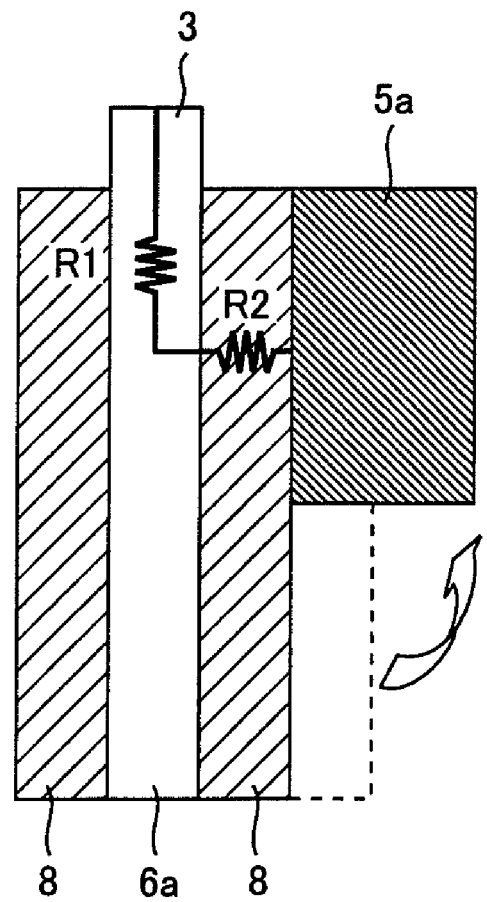

An example of an embodiment of the present invention discloses a method for adding activated carbon to the portion having a small potential variation resulting from the electronic resistance. In contrast to the capacitor layer 5a or 5b in FIG. 5(a) which is formed entirely over the active material 8 or 8' of the electrode, the lower half of the capacitor layer is shifted over to the upper half of the active material layer of the electrode to reduce, by R', the resistance value between a collector terminal 3 and the center of gravity of the portion of the electrode on which the capacitor layer has been formed. In this case, FIG. 5(b) shows an example in which the thickness of the capacitor material layer is doubled to hold the capacitance of the capacitor.

The portion having a small potential variation resulting from the electronic resistance is a portion having a low electronic resistance from the collector terminal, as is evident from the numerical expression. In other words, it can also be said that the portion having a small potential variation is a portion at a short distance from the terminal provided that the electrode is uniform. FIGS. 4(a) and 4(b) and FIGS. 5(a) and 5(b) show the respective descriptions given above to the thickness direction and planar direction of the electrode. In FIGS. 4(a) and 4(b) and FIGS. 5(a) and 5(b), the same reference numerals as used in FIG. 2 and FIGS. 3(a) and 3(b) denote the same or corresponding members. The distance (the distance between the terminal and the center of gravity of the capacitor layer) from the terminal of the collector terminal 10 to the portion where the activated carbon 12 is disposed is short, and the electronic resistance is low. By determining the position at which activated carbon is disposed based on the guideline, it is possible to improve the effect of the addition of activated carbon and increase the output of the device.

The following is the summary of the description given above. In the embodiment of the present invention, the energy conversion device in which the capacitor layer is formed to be closer to the collector terminal than the active material layer such that the electronic resistance A between the collector terminal and the center of gravity of the portion of the electrode on which the capacitor layer is formed is lower than the electronic resistance B between the collector terminal and the center of gravity of the capacitor layer formed on the active material layer of the electrode includes an energy conversion device for reducing the electronic resistance between the collector terminal and the center of gravity of the portion of the electrode on which the capacitor layer is formed, in contrast to an energy conversion device in which the capacitor layer is formed to cover substantially the entire surface of the active material layer.

In another embodiment of the present invention, the energy conversion device in which the capacitor layer is formed on the electrode such that the electronic resistance A between the collector terminal and the center of gravity of the capacitor layer on the electrode is lower than the electronic resistance B between the collector terminal and the center of gravity of the capacitor layer formed to cover substantially the entire active material layer of the electrode is an energy conversion device in which the capacitor layer is formed between the collector and the active material layer and the distance between the collector terminal and the capacitor layer is reduced to thereby lower the resistance value.

In still another embodiment, the present invention further includes an energy conversion device in which a portion A and a portion B are formed in the electrode, the electronic resistance between the collector terminal and the center of gravity of the electrode is lower in the portion A than in the portion B, and the concentration per unit area or unit volume of the capacitor material is higher in the portion A than in the portion B (where the concentration of the capacitor material in the portion B includes zero). In a typical example of the energy conversion device, the position at which the capacitor layer is formed is varied in the electrode. The capacitor layer may also be formed on the active material layer or between the active layer and the collector. Otherwise, the capacitor layer may also exist in the active material layer in merged relation.

In an electrode for a lead acid battery to which the structure described above is applied, the capacitor material effectively accumulates and releases charges. As a result, the electric double layer component of the capacitor material performs more effective charging and discharging in a lead acid battery using the electrode for a lead acid battery than in the conventional lead acid batteries (see, e.g., Patent Documents 2 and 3) to each of which the capacitor material represented by activated carbon is added, and provides a high input/output capability. Since the capacitor material is effectively used, the amount of the capacitor material to be added can be reduced, and an increase in energy density and a cost reduction can also be achieved. When the present invention is applied to a lead acid battery, a capacitor layer which accumulates charges in an electrode containing an active material is formed. As a result, it is possible to provide a lead acid battery comprising an electrode which makes most effective use of a capacitor material.

Next, a detailed description will be given to a first embodiment of the present invention with reference to the drawings as necessary. First, as an example of the present invention, a single-plate lead acid battery, which is a simple structure, and electrodes to be incorporated in the single-plate lead acid battery will be described. Of the drawings to be referenced, FIGS. 4(a) and 4(b) are views each illustrating a structure of the single-plate lead acid battery in which the electrode according to the present embodiment is incorporated.

Figure 2:
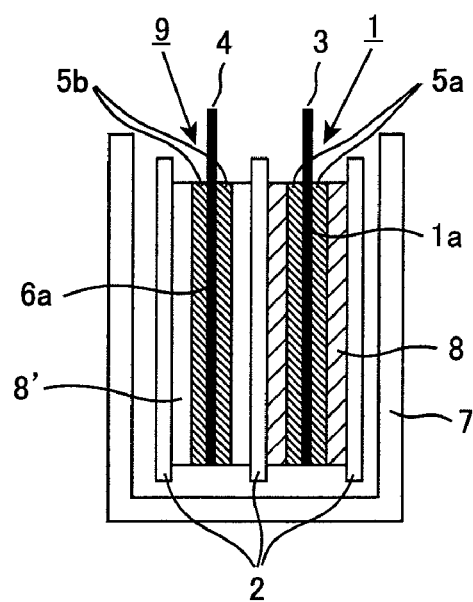
FIG. 2 is a schematic cross-sectional view showing a structure of an energy conversion device according to another embodiment of the present invention.

As shown in FIG. 2, the single-plate lead acid battery Va comprises a positive electrode 1a (electrode for a lead acid battery) of a positive electrode 1, a negative electrode 6b (electrode for a lead acid battery) of a negative electrode 9, separators 2, and a casing 7 for accommodating these members together with an electrolytic solution (not shown) containing a sulfuric acid ($H_2SO_4$).

The positive electrode 1 comprises the positive electrode plate 1a and a positive electrode capacitor layer 5a formed on one side of the positive electrode plate 1a. The negative electrode 9 comprises a negative electrode plate 6b and a negative electrode capacitor layer 5b formed on one side of the negative electrode plate 6b. The positive electrode side electrode plate 1a and the negative electrode plate 6a correspond to "a pair of electrodes" defined in the scope of claims, and the presence of the positive electrode capacitor layer 5a and the negative electrode capacitor layer 5b corresponds to "which contains a capacitor material".

In the single-plate lead acid battery Va, the positive electrode 1 having a positive electrode terminal 4 and the negative electrode 9 having a negative electrode terminal 3 are arranged such that the positive electrode capacitor layer 5a thereof and the negative electrode capacitor layer 5b thereof face each other. The separators 2 are disposed between the positive electrode capacitor layer 5a and the negative electrode capacitor layer 5b, outside the positive electrode plate 1a (the opposite side of the positive electrode capacitor layer 5a), and outside the negative electrode plate 6a (the opposite side of the negative electrode capacitor layer 5b).

The positive electrode plate 1a may be a known one. For example, the positive electrode plate 1a can be obtained by filling an active material paste for a positive electrode containing lead powder, minium, a filler, and the like in a collector grid made of a lead-calcium-tin alloy and then drying it. As is well known, a conversion process is performed in the positive electrode 1a to generate lead dioxide ($PbO_2$) as the active material 8 (positive electrode active material). To the positive electrode plate 1a, the positive electrode collector terminal 3 has been attached.

The negative electrode plate 6a may be a known one. For example, the negative electrode plate 6a can be obtained by filling an active material paste for a negative electrode containing lead (Pb) powder as the active material 8' (negative electrode active material), carbon powder, a filler, and the like in a collector grid made of a lead-calcium-tin alloy and then drying it. To the negative electrode plate 6a, the negative electrode collector terminal 4 has been attached.

The positive electrode capacitor layer 5a and the negative electrode capacitor layer 5b are in contact with the positive electrode plate 1a and the negative electrode plate 6a, respectively, while being in electrical contact with the respective active materials of the positive electrode plate 1a and the negative electrode plate 6a. Each of the positive electrode capacitor layer 5a and the negative electrode capacitor layer 5b accumulates charges and contains activated carbon, a binder, and a conductive additive.

As will be described later, activated carbon adsorbs or desorbs predetermined ions to or from the pores thereof during the charging or discharging of the single-plate lead acid battery Va.

The activated carbon may be a known one. Preferably, the activated carbon has a specific surface area of 700 $m^2/g$ to 3500 $m^2/g$. More preferably, the activated carbon has a specific surface area of 1200 $m^2/g$ to 1800 $m^2/g$ when consideration is given to the balance between an improvement in the output characteristic of the single-plate lead acid battery Va and cost.

The binder binds the positive electrode capacitor layer 5a and the negative electrode capacitor layer 5b to the positive electrode plate 1a and the negative electrode plate 6a, respectively, to provide electrical contact between the respective active materials of the positive electrode plate 1a and the negative electrode plate 6a and the positive electrode capacitor layer 5a and the negative electrode capacitor layer 5b, i.e., to provide electrical contact between the active materials and at least the activated carbon. The binder also binds the activated carbon to the conductive additive, which will be described later.

Examples of the binder include a fluorine resin such as polytetrafluoroethylene or polyvinylidene fluoride, a cellulose resin such as methyl cellulose, carboxymethyl cellulose, sodium carboxymethyl cellulose, hydroxypropylmethyl cellulose, hydroxyethylmethyl cellulose, or hydroxyethyl cellulose, a synthetic rubber such as ethylenepropylene rubber, styrenebutadiene rubber, chlorosulfonated polyethylene rubber, nitrile rubber, or methyl methacrylate-butadiene rubber, polyvinyl alcohol, butylglycol acetate, and ethyldiglycol acetate. In particular, a combination of a binder excellent in adhesive force such as polytetrafluoroethylene or styrenebutadiene rubber and a binder rich in thickening property such as methyl cellulose, carboxymethyl cellulose, sodium carboxymethyl cellulose, hydroxypropylmethyl cellulose, hydroxyethylmethyl cellulose, or hydroxyethyl cellulose is preferred because it allows easy adhesion between the positive electrode capacitor layer 5a and the positive electrode plate 1a and easy adhesion between the negative electrode capacitor layer 5b and the negative electrode plate 6a.

As the binder, a binder melted at a temperature in the range of 100° C. to 350° C. is preferred. The positive electrode capacitor layer 5a and the negative electrode capacitor layer 5b each containing such a binder achieve more excellent adhesion to the positive electrode plate 1a and to the negative electrode plate 6a by forming molten layers on the surfaces thereof when heated. For example, the positive electrode capacitor layer 5a and the negative electrode capacitor layer 5b each containing polytetrafluoroethylene are heated at a temperature in the range of 200° C. to 350° C. to form molten layers.

The conductive additive ensures excellent electron conductivity (a conductive path) between the activated carbon mentioned above and each of the positive electrode plate 1a and the negative electrode plate 6a and also ensures excellent electron conductivity (a conductive path) to each of the positive electrode capacitor layer 5a and the negative electrode capacitor layer 5b.

Examples of the conductive additive include carbon black, acetylene black, furnace black, natural graphite, artificial graphite, isotropic graphite, mesophase carbon, pitch-based carbon fiber, vapor grown carbon fiber, nano-carbon materials, and PAN-based carbon fiber. Among them, carbon black, acetylene black, and furnace black are preferred because the primary particles thereof have small diameters in the range of several tens of nanometers to about 100 nm, and therefore the addition of only a small amount thereof improves the electron conductivity (conductive path) mentioned above.

In the positive electrode capacitor layer 5a, the respective content ratios of activated carbon, the binder, and the conductive additive are preferably in the ranges of 15% to 94% by mass, 1% to 30% by mass, and 5% to 80% by mass, in the order listed. More preferably, the respective content ratios of activated carbon, the binder, and the conductive additive are in the ranges of 70% to 87% by mass, 3% to 10% by mass, and 10% to 20% by mass, in the order listed.

As described above, these positive electrode capacitor layer 5a and the negative electrode capacitor layer 5b are bonded to the positive electrode plate 1a and the negative electrode plate 6a to be in electrical contact therewith. In addition, the positive electrode capacitor layer 5a and the negative electrode capacitor layer 5b are preferably formed with micro-pores, i.e., porous bodies to allow the electrolytic solution to move to the adhesion surface between the positive electrode capacitor layer 5a and the positive electrode plate 1a and to the adhesion surface between the negative electrode capacitor layer 5b and the negative electrode plate 6a. These positive electrode capacitor layer 5a and negative electrode capacitor layer 5b can be obtained by setting the respective content ratios of the activated carbon, the binder, and the conductive additive to values in the ranges shown above.

By partially varying the concentration of the capacitor material within the range shown above or forming a portion where the capacitor layer is provided and a portion where the capacitor layer is not provided, the portion A having a high capacitor concentration and the portion B having a low capacitor concentration are formed on each of the electrodes. Alternatively, it is also possible to form the capacitor layer of the portion A at a position closer to the collector terminal than the portion B. For example, by shifting the capacitor layer 5a leftward in the drawing to bring it closer to the collector terminal (forming the capacitor layer on the surface of the collector) as shown in FIG. 4(b), the capacitor layer 5a can be brought closer to the collector terminal than in FIG. 4(a). As a result, it is possible to reduce the resistance R2 of the active material layer 8 or 8' present between the collector terminal 3 or 4 and the capacitor layer and significantly increase a potential change in the capacitor layer, as shown in the graph of FIG. 4(b).

In the embodiment described above, the positive electrode capacitor layer 5a and the negative electrode capacitor layer 5b are formed on the respective one side of the positive electrode plate 1a and the negative electrode plate 6a. However, the present invention is not limited thereto. It is also possible to form the positive electrode capacitor layers 5a and the negative electrode capacitor layers 5b on the respective both sides of the positive electrode plate 1a and the negative electrode plate 6a. Alternatively, in the present invention, it is also possible to form the capacitor layer (the positive electrode capacitor layer 5a or the negative electrode capacitor layer 5b) only on the positive electrode plate 1a or the negative electrode plate 6a.

FIG. 1 shows a schematic structure of an energy conversion device according to another embodiment of the present invention. The reference numerals shown in FIG. 1, which are the same as those shown in FIG. 2 denote the same or corresponding members. The difference between the device structure of FIG. 1 and that of FIG. 2 is that the capacitor layers 5a and 5b of FIG. 1 are formed only on the respective upper halves of a positive electrode plate and a negative electrode plate, in contrast to the capacitor layers 5a and 5b of FIG. 2 which are formed on the substantially entire surfaces of the positive electrode plate 1a and the negative electrode plate 6b. This indicates that, in the structure, the concentration of the capacitor material is high in the portion A (the upper halves of the positive electrode plate and the negative electrode plate), while the concentration of the capacitor material is zero in the portion B (5b, the lower halves of the positive electrode plate and negative electrode plate).

Next, the present invention will be described more specifically, while showing the examples of the present invention. The reference numerals shown in FIG. 8, which are the same as those shown in FIGS. 1 and 2, denote the same or corresponding members.

EXAMPLE 1

Comparative Example 1

Production of Negative Electrode Plate

First, to lead powder, 0.3% by mass of lignin, 0.2% by mass of barium sulfate, and 0.1% by mass of carbon powder relative to the lead powder were added. Then, polyester fiber was added thereto and the resulting mixture was kneaded with a kneader about 10 minutes. To the resulting mixture, 12% by mass of water relative to the lead powder was added and mixed, and 13% by mass of a dilute sulfuric acid (having a specific weight of 1.26 at 20° C.) relative to the lead powder was further added to prepare an active material paste for a negative electrode. 55 g of the active material paste for a negative electrode was filled in a collector grid made of a lead-calcium-tin alloy and measuring 116 mm×100 mm×1.4 mm, allowed to stand in an atmosphere at a temperature of 50° C. and a humidity of 98 RH % for 18 hours to be matured, and then allowed to stand at a temperature of 110° C. for 2 hours to be dried, whereby the unconverted negative electrode plate 6a was produced.

<Production of Positive Electrode Plate>

First, polyester fiber was added to a mixture of lead powder and minium. To the resulting mixture containing the lead powder, water and a dilute sulfuric acid (having a specific weight of 1.26 at 20° C.) were added. The resulting mixture was kneaded to produce an active material paste for a positive electrode. 55 g of the active material paste for a positive electrode was filled in a collector grid made of a lead-calcium-tin alloy and measuring 116 mm×100 mm×1.7 mm, allowed to stand in an atmosphere at a temperature of 50° C. and a humidity of 98 RH % for 18 hours to be matured, and then allowed to stand at a temperature of 110° C. for 2 hours to be dried, whereby the unconverted positive electrode plate 1a was produced.

<Production of Positive Electrode and Negative Electrode>

Figure 8A:
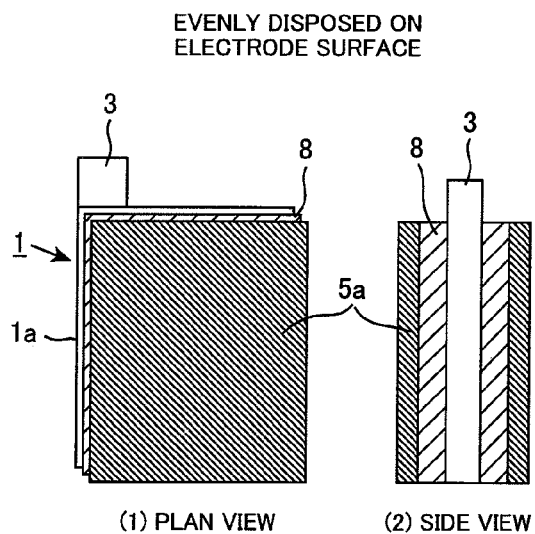
FIGS. 8(a) and 8(b) include plan views and side cross-sectional views illustrating a structure of a known electrode for a lead acid battery.
Figure 8B:
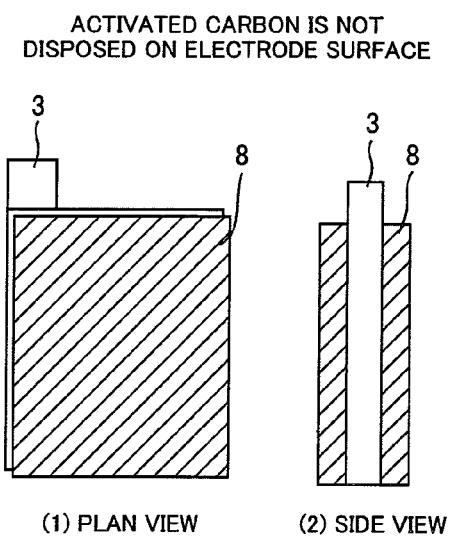

Phenol-based activated carbon powder having a specific surface area of 1300 $m^2/g$ and acetylene black having a specific surface area of 65 $m^2/g$ were weighed at a blending ratio of 75:15 percent by mass and sufficiently mixed. Then, 5% by mass of polytetrafluoroethylene powder was added to the resulting mixture and then dry-kneaded. The dry-kneaded mixture was crushed with a cutter mixer. Then, the obtained powder material was applied to one side of the positive electrode plate 1a in an amount of 400 mg of the powder material per piece of the positive electrode plate 1a. Then, by pressing the powder material on the positive electrode plate 1a with the application of a pressure of 50 MPa using a hydraulic press, the positive electrode capacitor layer 5a was formed on one side of the positive electrode plate 1a, whereby the positive electrode 1 was produced. FIG. 8(a) shows a schematic diagram of the positive electrode 1 produced according to the foregoing procedure as a comparative example 1. In FIGS. 8(a) and 8(b), the same reference numerals as shown in FIGS. 1 and 2 denote the same or corresponding members.

The negative electrode capacitor layer 5b was formed on one side of the negative electrode plate 5a by pressing the powder material mentioned above on the negative electrode plate 6a in the same manner as when the positive electrode capacitor layer 5a was formed, whereby the negative electrode 9 was produced. The depiction of the negative electrode produced according to the foregoing procedure is omitted.

In the formation of the positive electrode capacitor layer 5a and the negative electrode capacitor layer 5b, by using a hot press instead of the hydraulic press, the adhesion of the positive electrode capacitor layer 5a and the negative electrode capacitor layer 5b to the positive electrode plate 1a and the negative electrode plate 6a are further improved. Moreover, since the mass of each of the formed positive electrode capacitor layer 5a and negative electrode capacitor layer 5b is only about 0.7% by mass relative to the weight of each of the active material paste for a positive electrode and the active material paste for a negative electrode each mentioned above, manufacturing cost for the positive electrode 1 and the negative electrode 9 has been reduced.

<Production of Single-Plate Lead Acid Battery>

By using the produced positive electrode 1 and negative electrode 9, the single-plate lead acid battery Va shown in FIGS. 4(a) and 4(b) was produced. As the electrolytic solution, a dilute sulfuric acid having a specific weight of 1.225 (at 20° C.) was used. The conversion of the single-plate lead acid battery Va was performed with 2.2 A for 20 hours. After the conversion, a dilute sulfuric acid having a specific weight of 1.4 (at 20° C.) was added for concentration adjustment to change the electrolytic solution into a dilute sulfuric acid having a specific weight of 1.28 (at 20° C.). The battery capacity of the obtained single-plate lead acid battery Va was 1.75 Ah and the average discharge voltage thereof was 2V.

Then, the single-plate lead acid battery Va was discharged at −15° C. and with 10 CA. It is to be noted that "10 CA" is a current value with which the battery capacity can be discharged within 1/10 hour. In the present example, "10 CA" corresponds to 17 A.

Comparative Example 2

A single-plate lead acid battery similar to the single-plate lead acid battery Va according to Example 1 except that the positive electrode capacitor layer 5a and the negative electrode capacitor layer 5b were not provided was produced.

FIG. 8(*b*) is a schematic diagram of an electrode using the foregoing battery. The single-plate lead acid battery was discharged with 15 CA (26 A).

Example 1

To provide the positive electrode capacitor layer 5*a* and the negative electrode capacitor layer 5*b*, capacitor layers were formed using the same amount of activated carbon as used in Comparative Example 1 to have a configuration shown in FIG. 6(1), which is different only in the portions where the capacitor layers are formed. Although FIGS. 6(1) to 6(5) are front views and a side cross-sectional view each schematically showing the positive electrode, the negative electrode also has the same structure. In FIG. 6(1), a portion where the concentration A of the capacitor material is high is formed in the upper half of the positive electrode. The other portion is the portion B. The structure is substantially the same as in FIG. 1 described above.

Figure 7:
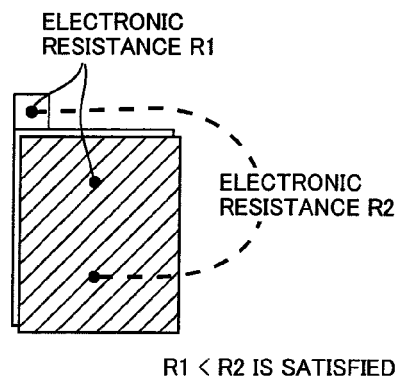
FIG. 7 is a schematic diagram showing a method for evaluating the electronic resistance of an electrode for a lead acid battery used in Example 1.

FIG. 7 shows a resistance measurement portion for determining the proper disposition of the activated carbon in Example 1.

Example 2

The positive electrode capacitor layer 5*a* and the negative electrode capacitor layer 5*b* were formed using the same amount of activated carbon as used in Comparative Example 1 to have the configuration shown in FIG. 6(1). That is, the capacitor layer was formed in the left half of the positive electrode to form the portion A. The other portion was the portion B. As for the negative electrode side, the depiction thereof is omitted.

Example 3

The positive electrode capacitor layer 5*a* and the negative electrode capacitor layer 5*b* were formed using the same amount of activated carbon as used in Comparative Example 1 to have the configuration shown in FIG. 6(3). That is, the capacitor layer was formed in the upper right quarter of the positive electrode to form the portion A. The other portion was the portion B.

Example 4

The positive electrode capacitor layer 5*a* and the negative electrode capacitor layer 5*b* were formed using the same amount of activated carbon as used in Comparative Example 1 to have a configuration shown in FIG. 6(4), in which the capacitor layer was formed as the portion A. The other portion was the portion B.

Example 5

Next, a description will be given to a most preferred example. By using the same amount of activated carbon as used on Comparative Example 1, the capacitor layer was formed in direct contact with a collector to have the configuration shown in FIG. 6(5). The structure corresponds to that described above with reference to FIG. 2.

(Evaluation of Discharge Voltage and Discharge Time)

As shown in Table 1, in each of the single-plate lead acid batteries Va according to Examples 1 to 4, the voltage 0.5-second after the initiation of discharging was higher than in Comparative Example 1 in which the same amount of activated carbon was used and in Comparative Example 2 in which activated carbon was not used.

Although the present invention has been described in relation to the lead acid battery, the present invention is not limited to the lead acid battery. It will be understood by a person skilled in the art that various modifications can be made within the scope of the appended claims.

TABLE 1

|  | Voltage after 0.5 seconds (V) |
|---|---|
| Comparative Example 1 | 1.82 |
| Comparative Example 2 | 1.80 |
| Example 1 | 1.85 |
| Example 2 | 1.86 |
| Example 3 | 1.85 |
| Example 4 | 1.84 |
| Example 5 | 1.88 |

What is claimed is:

1. An energy conversion device comprising: at least a pair of electrodes at least one of which contains a capacitor material; and an electrolyte having ion conductivity and electron insulation, the energy conversion device using an electric double layer formed at an interface between the capacitor material and the electrolyte to store energy, wherein
a layer of the capacitor material is formed to be closer to a collector terminal than an active material layer of each of the electrodes such that an electronic resistance A between the collector terminal and a center of gravity of the capacitor material layer in the electrode is lower than an electronic resistance B between the collector terminal and a center of gravity of a surface of the active material layer of the electrode.

2. The energy conversion device of claim 1, wherein the pair of electrodes are composed of a positive electrode containing lead dioxide as a main active material and a negative electrode containing metallic lead as a main active material.

3. The energy conversion device of claim 1, wherein the pair of electrodes are composed of a positive electrode and a negative electrode each capable of occlusion and desorption of a lithium ion, and the electrolyte contains a lithium salt or a lithium compound.

4. The energy conversion device of claim 1, wherein the pair of electrodes is composed of a positive electrode containing nickel hydroxide as a main active material and a negative electrode containing a hydrogen-occulated alloy as a main active material, and the electrolyte contains a hydroxide ion.

5. The energy conversion device of claim 1, wherein the capacitor material is activated carbon.

6. An energy conversion device comprising: at least a pair of electrodes at least one of which contains a capacitor material; and an electrolyte having ion conductivity and electron insulation, the energy conversion device using an electric double layer formed at an interface between the capacitor material and the electrolyte to store energy, wherein
a layer of the capacitor material is formed on the electrode such that an electronic resistance A between a collector terminal and a center of gravity of a portion of the electrode on which the capacitor material layer is formed is lower than an electronic resistance B between the collector terminal and a center of gravity of an active material layer of each of the electrodes.

7. An energy conversion device comprising: at least a pair of electrodes at least one of which contains a capacitor material; and an electrolyte having ion conductivity and electron insulation, the energy conversion device using an electric double layer formed at an interface between the capacitor material and the electrolyte to store energy, wherein
a portion A and a portion B are formed in the electrode such that an electronic resistance between a collector terminal, and a center of gravity of the corresponding one of the portions is lower in the portion A than in the portion B and the capacitor material is disposed to have a concentration per unit area or per unit volume which is higher in the portion A than in the portion B (where the concentration of the capacitor material in the portion B includes zero).

8. The energy conversion device of claim 7, wherein a distance between the collector terminal and the portion A in which the capacitor material is disposed to have a higher concentration is shorter than a distance between the collector terminal and the portion B in which the capacitor material is disposed to have a lower concentration.

9. The energy conversion device of claim 7, wherein the portion A is disposed within the electrode and the portion B is disposed in the vicinity of a surface of the electrode.

* * * * *